Oct. 19, 1948.  A. R. YGLESIAS-PAZ  2,451,462
DRYING APPARATUS FOR COFFEE BEANS OR THE LIKE COMPRISING
A MOVABLE AGITATOR AND GAS CIRCULATING MEANS
Filed April 21, 1944  3 Sheets-Sheet 3
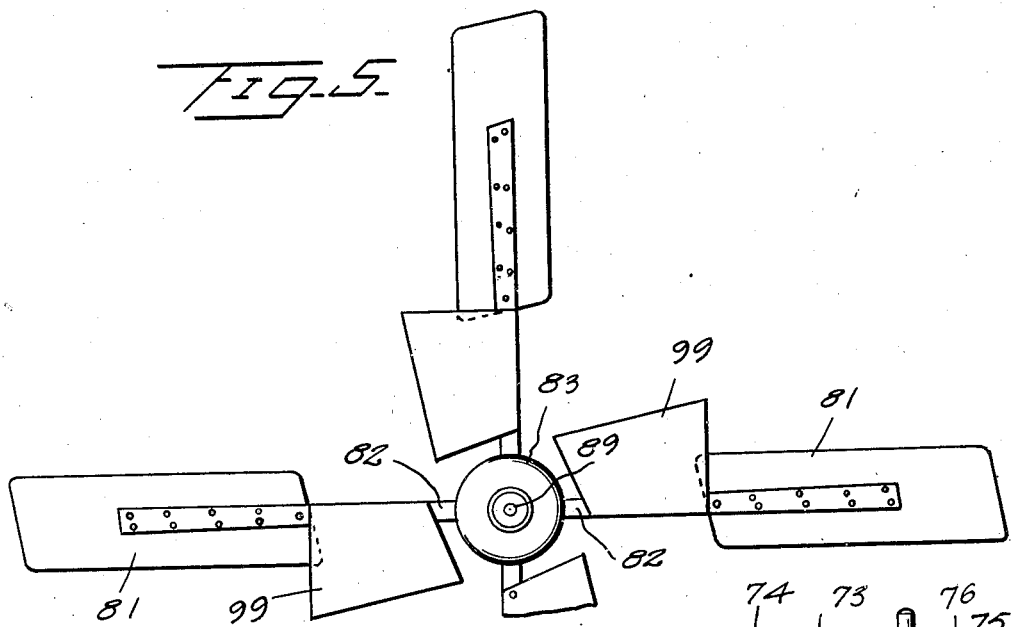
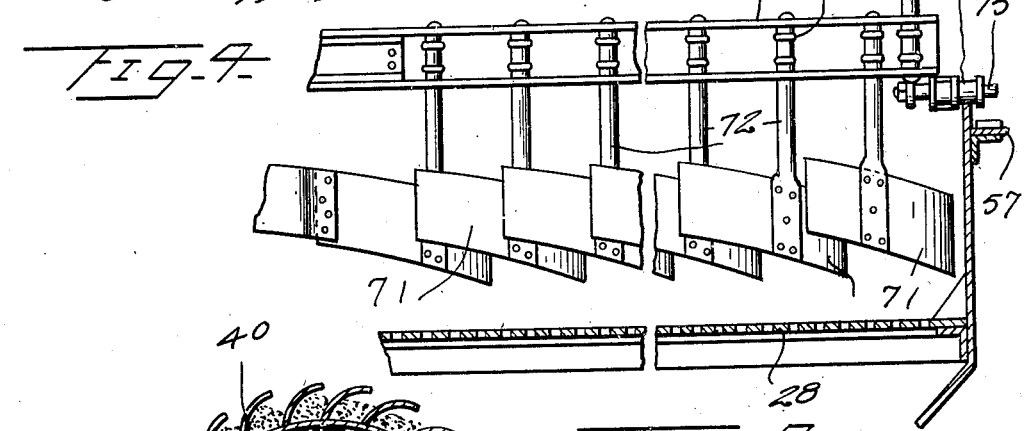
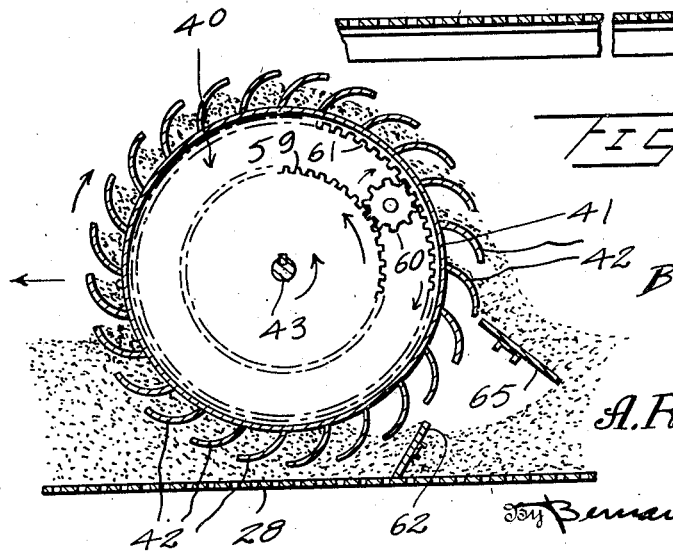
Inventor
A. R. Yglesias-Paz
By Bernard F. Garvey
Attorney Patented Oct. 19, 1948

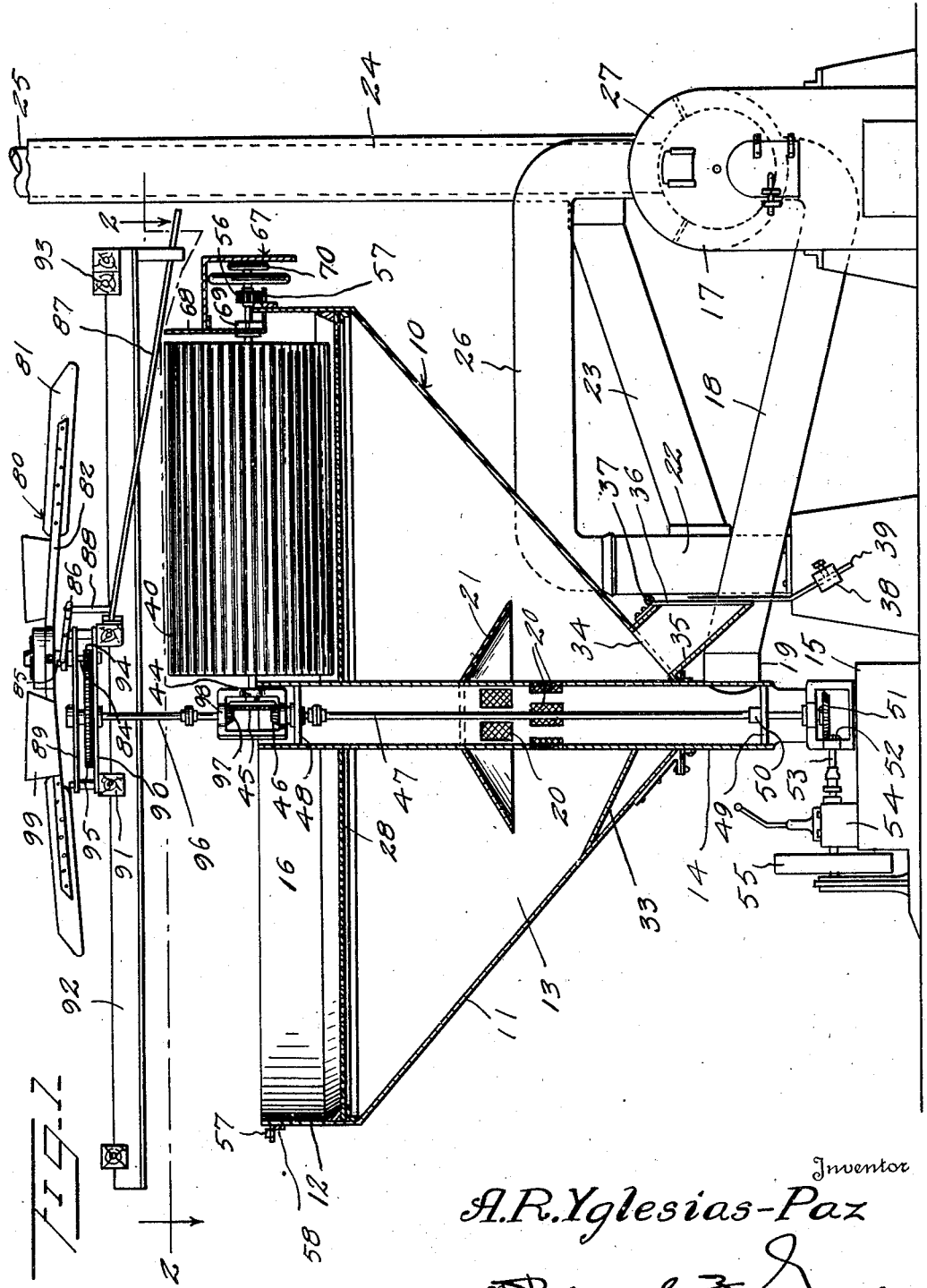

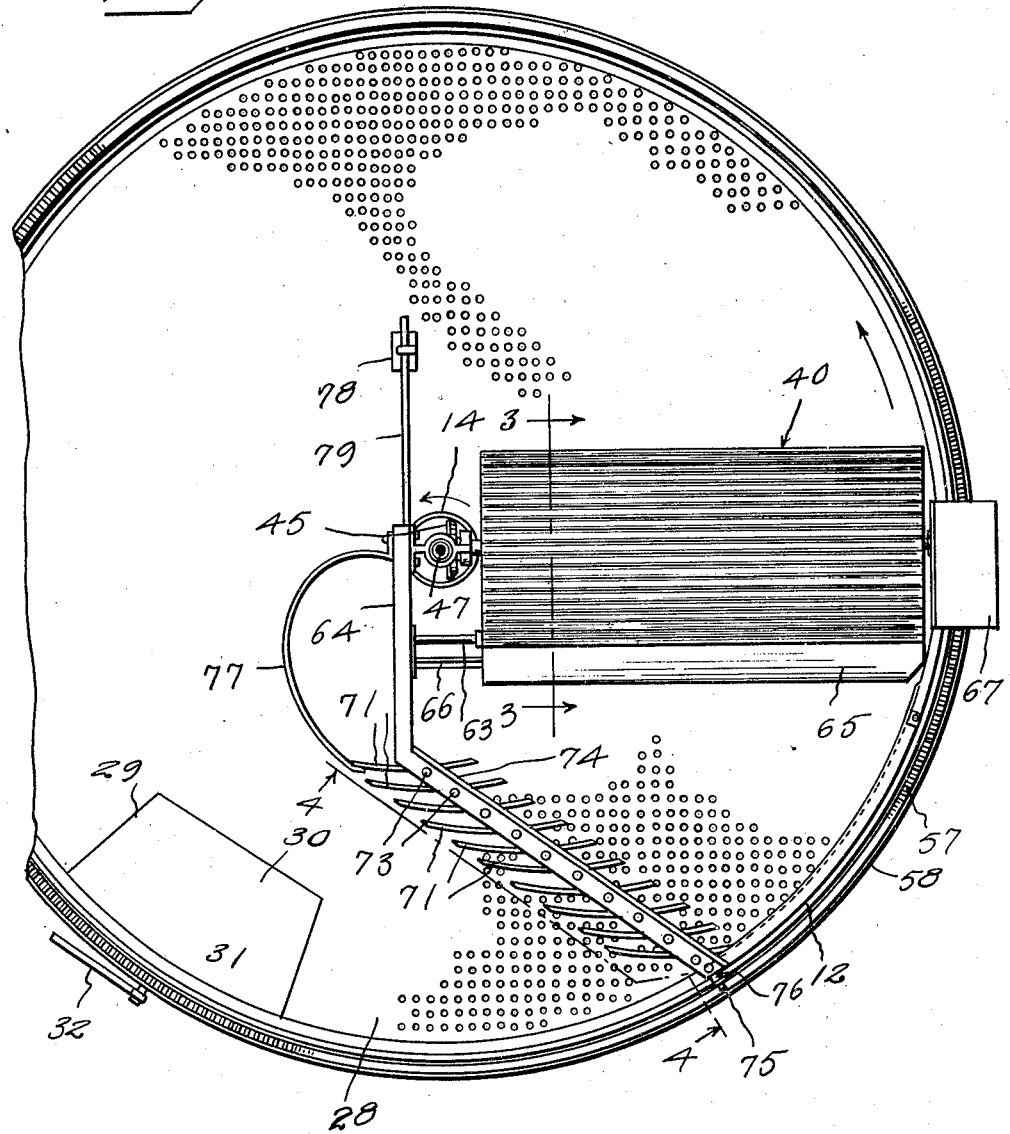

2,451,462

UNITED STATES PATENT OFFICE 2,451,462

DRYING APPARATUS FOR COFFEE BEANS OR THE LIKE, COMPRISING A MOVABLE AGITATOR AND GAS CIRCULATING MEANS

Adolfo Raul Yglesias-Paz, Guatemala City, Guatemala

Application April 21, 1944, Serial No. 532,077

2 Claims. (Cl. 34—181)

This invention relates to drying apparatus for coffee beans or the like.

An object of this invention is to provide a drying apparatus which includes a stationary receptacle wherein the coffee is positioned, the receptacle having a perforate bottom whereby heated air may be discharged into the lower portion of the receptacle and the apparatus also including means whereby the coffee beans are continually turned over or agitated as they are being dried.

Another object of this invention is to provide in a device of this kind, means whereby the coffee beans are agitated through the medium of a rotating drum, and the beans are also subjected to further agitation by means of agitating blades which rotate about the receptacle as the drum rotates within and about the receptacle.

Another object of this invention is to provide in a device of this kind an improved means for circulating the heated air through the beams so that there will be an even temperature directed on to the beans in all parts of the receptacle.

Another object of this invention is to provide in a device of this kind an improved agitating drum which is formed with a fluted or channeled periphery, the drum rotating about a horizontal axis in a direction reverse from the rotation or swinging of the drum about a vertical axis.

A further object of this invention is to provide a device of this kind which includes an improved means for carrying off the moisture-laden air which rises from the coffee beans above the perforate wall of the receptacle, so that the beans will dry more quickly than with apparatus heretofore available.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a vertical section, partly in detail, of a coffee drying apparatus constructed according to an embodiment of this invention.

Figure 2 is a fragmentary horizontal section taken substantially on the line 2—2 of Figure 1.

Figure 3 is a fragmentary sectional view taken on the line 3—3 of Figure 2.

Figure 4 is a fragmentary sectional view taken on the line 4—4 of Figure 2.

Figure 5 is a fragmentary top plan of the propeller or fan blade structure used with this apparatus.

Referring to the drawings, the numeral 10 designates generally a receptacle which is formed of an inverted conical lower housing 11, having extending from the upper or large end thereof a cylindrical wall 12. The lower housing 11 forms an air chamber 13, within which heated air is discharged as will be hereinafter described.

The receptacle or housing 10 is supported from a centrally disposed tubular member 14, which rises from a base 15. The tubular supporting member 14 extends centrally and upwardly into the housing 11 and terminates at its upper end at substantially the upper edge of the cylindrical portion 12. The cylindrical portion 12 defines an upper coffee bean chamber 16 within which the coffee beans are adapted to be positioned.

A boiler or air heating member 17 is disposed laterally of the housing structure 10, and is provided with a hot air duct or pipe 18, which extends from the heater 17 and is connected to a nipple 19 communicating with the lower portion of the tubular supporting member 14. The supporting member 14 constitutes a central air duct so that the hot air discharged from the pipe or duct 18 may be conducted to the hot air chamber 13. The duct or tubular member 14, at a point within the chamber 13 is formed with a plurality of openings 20 which are circumferentially spaced apart and communicate the interior of the duct 14 with the interior of the chamber 13.

A stationary conical deflector 21 is secured to the tubular member 14 within the chamber 13 at a point above the openings 20, so that the hot air discharged from the duct 14 will be deflected outwardly and downwardly into the lower portion of the chamber 13, and from this lower portion of the chamber 13, the air passes upwardly toward the outer portion of the chamber 13.

A blower 22, is disposed exteriorly of the housing 10 and has an intake duct or pipe 23 connected to the intake side thereof, the duct or pipe 23 being also connected to a vertical pipe 24 which is loosely positioned about a vertical stack 25 forming the draft for the heater 17. The outlet side of the blower 22 is connected to one end of an air conducting pipe 26, which is connected to an air heating chamber 27 formed about the boiler or heater 17.

The pipe or duct 18 is connected to the outlet side of the chamber 27, so that the air heated by the heater 17 will be forcibly moved through the pipe 18, this air being initially preheated by the stack 25.

The housing 10 has fixedly mounted therein, in the lower portion of the chamber 16 a perforate wall or disc 28. The perforate wall 28 divides the two chambers 13 and 16, and the openings in the wall 28 are slightly smaller than the beans, so that the beans will not drop through the openings or perforations in the wall 28.

The wall 28 is provided with an opening 29 adjacent the outer margin thereof, and a pivoted closure 30 which is connected to a shaft 31 is adapted to be selectively moved from a horizontal closed position to a vertical or inclined open position by rocking of a handle 32 so as to provide for the discharge of the dried coffee beans from the chamber 16 into the lower chamber 13.

A guide or deflector blade 33 is mounted on the inside of the chamber 13, and is inclined in the direction of an outlet or discharge opening 34 positioned adjacent the apex of the lower housing 11. A discharge nipple 35 is secured to the lower portion of the housing 11, and extends downwardly and laterally from the opening 34. The nipple 35 is formed with a lower outer vertical edge, and a closure plate 36, mounted on a hinge or pivot structure 37 is constantly urged to a closed position by means of a weight 38 which is adjustably mounted on a depending and laterally inclined rod 39. The weight 38 gravitatingly maintains the closure 36 in a closed position, so that during the drying cycle, the heated air in the chamber 13 will not exhaust from the nipple 35.

In order to provide for the agitation or turning over of the coffee beans within the chamber 16, I have provided an agitating drum, generally designated as 40. The drum 40 includes a cylindrical body 41 which has mounted on the outer surface thereof, a plurality of channeled circumferentially spaced apart pocket forming members 42. The drum 40 is rotatably mounted on a shaft 43, which is disposed in a horizontal position and is journaled at the inner end thereof in a bearing 44.

The shaft 43 at its inner end has secured thereto a beveled gear 45 which meshes with a beveled gear 46 mounted on a vertical shaft 47. The shaft 47 is journaled at its upper portion in a bearing 48 mounted within the tubular member 14, and extends axially and downwardly with the member 14. The lower portion of the shaft 47 is journaled in a lower bearing 49, and a collar 50 is secured to the shaft 47 and bears against the upper side of the bearing 49. The bearings 48 and 49 close the tubular member 14, so that the hot air from duct 18 can only be discharged into chamber 13 from openings 20. The lower end of the shaft 47 has secured thereto a lower beveled gear 51 which meshes with a pinion or driving gear 52 mounted on a driving shaft 53. The shaft 53 extends from a transmission 54 which is connected with a driving pulley or element 55. It will be understood that the pulley or driving element 55 may be operated from a motor, internal combustion engine or other suitable power device.

The drum shaft 43 extends entirely through the drum 40, and at its outer end has mounted thereon a small spur gear 56 which meshes with a ring gear 57. The ring gear 57 is mounted on an annular supporting bracket 58 which is secured to the outer side of the cylindrical member 12 at a point slightly below the upper end of the latter, and the rotation of the drum shaft 43 will provide for the rotation of the drum 40 in a horizontal plane about the axis of the shaft 47. Preferably, the drum 40 operates in a direction about the shaft 43 reversely from the swinging or horizontal rotation of the shaft 43 about the axis of the shaft 47. This is accomplished by means of intermeshing gearing 59, 60, and 61. The gearing 59 is secured to the shaft 43 and the intermediate gear 60 may be supported in any suitable manner so that the rotation of the drum driving gear 59 will provide for the reverse rotation of the drum 40. As shown in Figure 3, the drum 40 rotates in a clockwise direction, whereas the drum also swings about the axis of the shaft 47 in a counter-clockwise direction. Gear 60 may be supported in any suitable manner, such as by a stub shaft carried by plate 68.

A scraper or plow blade 62 is disposed on the rear or trailing side of the drum 40, being supported on a supporting bar 63 which is secured to a beam 64. The beam 64 is fixedly secured to the bearing structure 44 and extends at right angles with respect to the drum shaft 43. The scraper of plow blade 62 is disposed in a position to substantially contact with the upper side of the wall 28, so that the coffee beans will be pushed forwardly by the forward side of the plow or scraper 62, and at the same time as the beans gather on the forward side of the blade 62, the bean lifting members 42 rotate downwardly, forwardly, and upwardly, so as to pick up the gathered beans, and drop such beans on the trailing side of the drum 40.

There is also provided a deflector plate 65, which is positioned rearwardly of and upwardly with respect to the plow or scraper blade 62. The deflector or guide 65 is mounted on a supporting bar 66 which is also secured to the supporting beam 64. The deflector member 65 is inclined downwardly and rearwardly with respect to the drum 40, and is inclined in a direction opposite from the plow or scraper blade 62. The deflector blade 65 is adapted to receive the beans which are discharged from the cup-shaped or channel member 42, so as to prevent the beans from being carried around with the drum and so that the beans will be discharged on the rear side of the drum in an even layer, the layer having been overturned through the medium of the plow 62 and the lifting members 42.

A shield or housing of substantially L-shape, which opens downwardly and designated by the numeral 67, is secured to a vertically disposed plate 68 which is secured to an outer bearing 69 for the shaft 43, and the shield or guard 67 engages about the outer end of the shaft 43 and the pinion 56. A hand wheel 70 is secured to the outer end of the drum shaft 43, the shield 67 being removable so that if desired, the drum 40 may be selectively rotated by hand.

The coffee beans are also further agitated or stirred as the drum rotates and swings within the chamber 16, by means of a plurality of agitating blades 71. The blades 71 are each mounted on a vertically disposed shank 72 which is secured by U-shaped fastening members 73 to a supporting beam 74. The supporting beam 74 may be formed integral with the beam 64 and is inclined at an obtuse angle to the beam 64. The outer end of the supporting beam 64 has secured thereto a stub shaft 75 on which a roller 76 is mounted. The roller 76 engages the upper edge of the cylindrical member 12, and is positioned above the rack or annular gear 57. The agitating blades 71, as shown in Figure 2, are formed on a reverse curvature, and, as shown in Figure 4, are inclined to the horizontal, being inclined forwardly and downwardly from the rear ends thereof. The agitating blades 71 are positioned at any suitable distance above the perforate wall 28, so that they will not contact with the wall, but are close enough thereto in order to provide for the shifting of the beans from the outer portion of the chamber 16 toward the center thereof.

The blades 72 are spaced apart from each other so that the coffee beans may pass between pairs of adjacent blades from the leading to the trailing edges thereof, and will not be entirely moved toward the center of the chamber 16. A longitudinally curved blade 77 is secured at one end to the trailing end of the innermost blade 71 and is secured at the opposite end thereof to the bar 64, adjacent the bearing structure 44. A counterbalancing weight 78 is mounted on a horizontally disposed bar 79 which extends from the supporting bar 64 opposite from the agitating structure including the blades 71 and the supporting bar 74. The counterweight 78 may be adjusted at any point along the length of the supporting bar 79 so as to provide for equalizing the weight of the plow structure with respect to the supporting bearing 44.

In order to provide for the circulation of currents of air over the surface of the mass of beans within the chamber 16, and while the beans are in agitation, whereby the moisture laden air arising from the beans is driven off and the drying of the beans is accelerated, I provide a fan blade structure, generally designated by the numeral 80. This fan blade structure includes a plurality of radical supporting bars 82 extending from a central hub 83 that is secured to a central shaft 84. Secured to the supporting bars 82 are blades 81 and 99. The blades 81 and 99 are so pitched with respect to each other that the series of blades 81 cause a circulation of air in one direction and the blades 91 cause a circulation of air in an opposite direction so that as the fan blade structure revolves there is produced over the surface of the coffee grains a flow of air that serves to drive off the moist air as the latter passes upwardly through the mass of beans. In this manner the drying of the beans is accelerated and is substantially uniform throughout the mass.

The aforementioned shaft 84 is connected with a conventional clutch structure 85 operated by means of a fork lever 86. A clutch operating rod 87 is connected with the fork lever 86 by means of a connecting link 88. Shaft 84, as shown, is journaled through a pair of spaced apart plates 89 and 90, which are secured to a horizontally disposed supporting structure 91.

The supporting structure 91 is in the form of a pair of inner horizontal beams which are secured to right angularly disposed supporting beams 92. The beams 92 are secured to outer beams 93 and the entire structure including the beams 91, 92, and 93 constitute a supporting frame above the housing 10 and supported in any suitable manner thereabove. A small gear or pinion 94 is fixed to the shaft 84 between the plates 89 and 90, and meshes with a large driving gear 95 which is mounted on the upper end of a fan shaft 96. The fan shaft 96 has a beveled gear 97 at the lower end thereof extending through a bearing 98, forming part of the bearing structure 44 and the gear 97 meshes with the gear 45. The shaft 96 is adapted to rotate the fan blade structure 80 in a counter-clockwise direction.

In the use and operation of this drying apparatus, the coffee beans are discharged into the chamber 16, and may initially be smoothed into a substantially even layer on the perforate wall 28. The blower 22 will force air which is heated by the heater 17 into the central duct 14 and the heated air will be discharged into the chamber 13 through the openings 20. The deflector 21 will spread this air outwardly toward the inverted base of the housing 11, and the heated air will then be forced upwardly through the perforate wall 28 into contact with the beans B which are positioned on the wall 28.

Simultaneously with the forcing of the heated air through the layer of beans B, the drum 40 is rotated around the horizontal shaft 43 by means of the shaft 47. The drum 40 will rotate in a manner to pick up the beans as the drum agitates around the layer of beans, and the plow 62 will provide for complete turnover or lifting of the beans from the wall 28.

As the drum 40 rotates and guides the beans thereabout, the beans are discharged on to the shield or deflector 65, which is positioned rearwardly of the plow or scraper 62. The deflector 65 will act as a leveling means to form an even layer of the beans on the rear side of the drum 40. In addition to the complete lifting and turning over of the beans by rotation of the drum 40 on the horizontal shaft 43 which swings about the central axis of the shaft 47, the agitating or stirring blades 71 will laterally agitate the beans and will provide for the shifting of the beans from the outer margin of the chamber 16 toward the central portion thereof.

After the beans have been agitated for a sufficient length of time to provide for the complete drying thereof, the gate or closure 30 may be swung to an open position and the beans will be discharged simultaneously as they are being agitated, the beans dropping into the air chamber 13 and flowing downwardly over the guide 33 and finally discharging out of the discharge nipple 35, the closure 36 at this time being lifted to permit the beans to be discharged into bags or other suitable containers.

The closure 30 may be pivoted at one edge thereof, such as the left edge as viewed in Fig. 2, the handle 32 being connected to the closure 30 through suitable means of a conventional character, such as a cam or lever which will lower closure 30 at the right edge and permit the beans to roll down closure 30 into chamber 13. Rotation of drum 40 tends to shift the beans to the outer portion of chamber 16, and as drum 40 discharges the beans to the rear thereof, when closure 30 is open the beans between drum 40 and the blades 71 will drop through opening 29.

What is claimed is:

1. A bean drier comprising an upper bean chamber, a lower air chamber, a perforate partition wall common to said chambers, means operatively connected with the air chamber for forcing hot air upwardly therethrough and through the mass of beans in the bean chamber, a driven fan disposed above the bean chamber for producing a flow of air over the entire surface of the mass of beans for drawing off moist air arising therefrom, and means interposed between the perforate wall and the fan means for agitating the beans while subject to the action of the hot air and the air circulation produced by said fan means embodying a drum equipped to bodily lift beans upwardly from the leading side of the drum and deposit the beans at the trailing side thereof, means operatively connected with the drum for rotating the latter about a horizontal axis, and means operatively connected with drum for swinging the latter about a vertical axis passing through the centers of said chambers simultaneously with the rotation of the drum, and a gang of agitating blades trailing the drum in its movement about the vertical axis for shifting the beans toward the center of the bean chamber.

2. A bean drier comprising an upper bean chamber, a lower air chamber, a perforate partition wall common to said chambers and providing a rest for a mass of beans within said bean chamber, hot air delivery means operatively connected with the air chamber for forcing hot air upwardly therethrough and through the mass of beans, bean-agitating means within the bean chamber including a drum simultaneously rotatable about a horizontal axis and swingable about a vertical axis passing through the centers of the chambers to bodily lift beans upwardly from one side of the drum and deposit the beans at the opposite side thereof, and a gang of agitating blades trailing the drum in its movement about the vertical axis for shifting the beans toward the center of said chamber, and a driven fan means disposed above the bean agitating means and embodying two series of blades, one of which is adapted and arranged to cause a circulation of air over the surface of the mass of beans in one direction and the other of which is adapted and arranged to cause a circulation of air over the surface of the mass of beans in an opposite direction.

A. RAUL YGLESIAS-PAZ.

REFERENCES CITED

The following references are of record in the file of this patent:

UNITED STATES PATENTS

| Number | Name | Date |
|---|---|---|
| 42,333 | Mey | Apr. 12, 1864 |
| 76,508 | Oefinger et al. | Apr. 7, 1868 |
| 209,794 | Beaven | Nov. 12, 1878 |
| 246,616 | Kimplen | Sept. 6, 1881 |
| 283,723 | Renner et al. | Aug. 21, 1883 |
| 322,252 | Bunnell | July 14, 1885 |
| 410,085 | Gent | Aug. 27, 1889 |
| 832,874 | McElroy | Oct. 9, 1906 |
| 1,020,256 | Boll | Mar. 12, 1912 |
| 1,213,962 | Siler | Jan. 30, 1917 |
| 1,231,594 | Fullard | July 3, 1917 |
| 1,433,608 | Fleury | Oct. 31, 1922 |
| 1,460,519 | Wadsworth | July 3, 1923 |
| 1,672,272 | Moore | June 5, 1928 |
| 1,744,884 | Greiner | Jan. 28, 1930 |
| 1,770,409 | Kehoe | July 15, 1930 |
| 2,064,581 | Wilson | Dec. 15, 1936 |
| 2,101,502 | Keller | Dec. 7, 1937 |
| 2,142,568 | Lowry | Jan. 3, 1939 |

FOREIGN PATENTS

| Number | Country | Date |
|---|---|---|
| 776,418 | France | Jan. 25, 1935 |